(12) United States Patent
Delehanty et al.

(10) Patent No.: US 9,284,454 B2
(45) Date of Patent: Mar. 15, 2016

(54) ROOM TEMPERATURE CURABLE SILICONE ELASTOMER COMPOSITION

(75) Inventors: Jane Mary Delehanty, London (GB); Ian Moss, Somerset (GB); Stephen Westall, Glamorgan (GB); Thomas Dowden, London (GB)

(73) Assignee: FormFormForm Ltd., London (GB)

( * ) Notice: Subject to any disclaimer, the term of this patent is extended or adjusted under 35 U.S.C. 154(b) by 367 days.

(21) Appl. No.: 12/517,057

(22) PCT Filed: Nov. 29, 2007

(86) PCT No.: PCT/GB2007/004580
§ 371 (c)(1),
(2), (4) Date: Jan. 21, 2010

(87) PCT Pub. No.: WO2008/065406
PCT Pub. Date: Jun. 5, 2008

(65) Prior Publication Data
US 2010/0144961 A1   Jun. 10, 2010

(30) Foreign Application Priority Data

Nov. 30, 2006  (GB) .................................. 0623972.7

(51) Int. Cl.
| C08L 83/04 | (2006.01) |
| C08K 3/04 | (2006.01) |
| C08K 3/10 | (2006.01) |
| C08K 3/34 | (2006.01) |
| C08K 3/22 | (2006.01) |
| C08K 3/36 | (2006.01) |
| C08K 5/5419 | (2006.01) |

(52) U.S. Cl.
CPC . *C08L 83/04* (2013.01); *C08K 3/04* (2013.01); *C08K 3/10* (2013.01); *C08K 3/34* (2013.01); *C08K 3/346* (2013.01); *C08K 3/36* (2013.01); *C08K 5/5419* (2013.01); *C08K 2003/2217* (2013.01); *C08K 2003/2241* (2013.01)

(58) Field of Classification Search
None
See application file for complete search history.

(56) References Cited

U.S. PATENT DOCUMENTS

| 3,696,090 | A | | 10/1972 | Lampe |
| 3,943,091 | A | | 3/1976 | Akiyama |
| 3,989,790 | A | | 11/1976 | Bruner et al. |
| 4,131,589 | A | * | 12/1978 | Smith, Jr. ..................... 524/789 |
| 4,426,509 | A | | 1/1984 | Maass et al. |
| 4,476,155 | A | | 10/1984 | Niemi |
| 4,514,446 | A | * | 4/1985 | Kadono et al. .................. 53/472 |
| 4,514,529 | A | * | 4/1985 | Beers et al. ..................... 523/200 |
| 4,696,842 | A | | 9/1987 | Doubt |
| 4,785,495 | A | | 11/1988 | Dellis |
| 4,800,124 | A | * | 1/1989 | Davis et al. .................... 428/391 |
| 5,086,107 | A | * | 2/1992 | Arai et al. ...................... 524/424 |
| 5,155,878 | A | | 10/1992 | Dellis |
| 5,171,773 | A | | 12/1992 | Chaffee et al. |
| 5,431,563 | A | | 7/1995 | Huybrechts |
| 5,536,544 | A | | 7/1996 | Liegeois |
| 5,708,076 | A | * | 1/1998 | Tsuji et al. ..................... 524/788 |
| 6,299,952 | B1 | * | 10/2001 | Honma et al. ............... 428/36.5 |
| 6,328,494 | B1 | | 12/2001 | Moxon |
| 6,838,499 | B2 | * | 1/2005 | Kimura ......................... 524/268 |
| 7,888,421 | B2 | | 2/2011 | Scholey et al. |
| 2006/0142472 | A1 | | 6/2006 | Hirai et al. |

FOREIGN PATENT DOCUMENTS

| EP | 0 300 643 A2 | 1/1989 |
| EP | 0 575 863 | 12/1993 |
| EP | 0 816 436 | 1/1998 |
| EP | 0 905 195 | 3/1999 |
| EP | 1 884 541 A1 | 2/2008 |
| EP | 1 914 271 A2 | 4/2008 |
| GB | 2 288 406 | 10/1995 |
| GB | 2 403 723 | 1/2005 |
| WO | WO-03/072267 | 9/2003 |
| WO | WO-2006/125995 | 11/2006 |
| WO | WO-2006/126000 | 11/2006 |
| WO | WO-2007/037552 A2 | 4/2007 |
| WO | WO-2007/081431 A1 | 7/2007 |

OTHER PUBLICATIONS

Website for the sale of Permatex 22071 RTV Silicone Gasket http://www.frsport.com/RTV-Silicone-Gasket-0-5-oz-_L_p_203267.html?gclid=Cj0KEQjwrPqnBRD56dGe1o_WIZsBEiQAb5ugt4_2cSojdl6LHEQabfouojPwkfrMrvqNJBIP87GqMwYaAnM48P-8HAQ.*

United Kingdom Search Report dated Mar. 21, 2007.

* cited by examiner

*Primary Examiner* — Marc Zimmer

(74) *Attorney, Agent, or Firm* — Heslin, Rothenberg, Farley & Mesiti, P.C.

(57) ABSTRACT

By preparing a one part silicone RTV composition with a high initial uncured plasticity, specifically a Williams plasticity of from 80 to 900 mm, formulations can be prepared that are easy and convenient for consumers to mold into a variety of shapes, which, once molded, will hold their shape exactly during cure without slump or flow.

12 Claims, No Drawings

ROOM TEMPERATURE CURABLE SILICONE ELASTOMER COMPOSITION

The present invention relates to a novel room temperature curable silicone elastomer composition, which can be used for a variety of purposes, either by the end consumer for the customisation of existing tools and the like or by a manufacturer for the production of tools etc. having grips customisable by the end user.

We have now discovered that moisture curing room temperature vulcanising (RTV) materials, formulated to a sufficiently high plasticity value as an uncured material, can be used to allow end-users to easily customize or personalize products and equipment for their comfort, fun or excitement.

Hand mouldable RTV (Room Temperature Vulcanising) silicone compositions are known in the art (for example U.S. Pat. No. 3,943,091; GB32403723), and typically comprise either two part condensation or addition cure compositions. Compositions of this type have in the past been formulated primarily for mould making applications, where the elastomer is moulded onto a substrate to form a cast of the object, and then removed when cured to provide a mould for replication of the substrate. Such compositions are used in applications such as: rapid prototyping; reproduction of figurines, collectibles, jewellery, candles, and artefacts; creation of silicone rubber pads for transfer printing; and architectural fabrication. The compositions described have not been used for customisation of tools and the like.

Materials that have been used until now to allow end-users to customize or personalize the shape of products have been either thermoplastic materials which require high temperatures either to become formable or to cure (hot air or hot water), materials that cure through solvent evaporation, or materials that require the user to mix components together. All of the materials that have been used thus far for this purpose have had technical restrictions, which have limited their commercial potential.

For example, U.S. Pat. No. 4,696,842 describes the use of a sheet of polymeric material to produce a customisable hand grip for sports implements, hand tools etc. However, the sheet is of a polyurethane or a copolymer, such as styrene-butadiene rubber, rather than the silicone used in the present invention, and cures in a different way.

U.S. Pat. No. 5,155,878 provides a similar material to that described in U.S. Pat. No. 4,696,842, except that it is a two-layer construction designed to allow the hand grip to be remoulded to suit a variety of different individuals. No specific material is suggested for use in preparing such hand grips.

U.S. Pat. No. 4,785,495 describes the use of heat-formable materials as hand-grips which can be formed to their final shape by the end-user. The use of these materials has been very limited for this purpose because of the equipment involved and conditions required to form the material e.g. a heat-gun is required to make the material formable.

Likewise, U.S. Pat. No. 5,431,563 and U.S. Pat. No. 5,536,544 require the use of heat to allow the materials used to become formable and/or to cure.

None of the materials described above can be used to mass-manufacture products with customisable parts, which can easily be customised by the consumer at room temperature.

Some attempts have been made by manufacturers to provide methods by which consumers may customise or personalise the shape of their products. This has normally consisted of a kit of some kind, and again, the process of forming or customising was too cumbersome and time consuming to be appealing to a large number of consumers.

For example, U.S. Pat. No. 6,328,494 describes the use of a modelling material to provide tool holders which the user could form to its final shape. This was provided to the user as a kit of two separate parts—the tool, and the modelling putty material. No specific material is defined, but modelling clay is mentioned. Modelling clays are not formulated to be used in this way, and so they have no adhesive properties or properties that make them perform well as grip materials. No process of priming is described which would form an adhesive bond between these modelling materials and the substrate of the tools. In addition, because modelling clays which set to a shape at room temperature are not formulated for this purpose, they perform poorly as grip materials. They have very low abrasion, water, heat and chemical resistance, and have no resilient, elastic, vibration damping or soft-touch qualities as do the materials of the present invention. Materials formulated as modelling materials such as the ones described in U.S. Pat. No. 6,328,494 would never be used by manufacturers to provide customisable parts in products because of these limitations. Of the thermosetting materials described, there are further disadvantages arising from the need for the consumer to heat them, and with the 2-part silicone materials described, further difficulties arising from the need for the consumer to mix components together and a lack of any adhesive properties mean that they have very few of the benefits of the present invention.

Accordingly, the present invention provides a one part room temperature curable silicone elastomer composition where the uncured composition has a Williams plasticity from 80 mm to 900 mm.

The Williams plasticity test used herein is carried out as follows:

A cylindrical sample 10 mm long and 1 $cm^2$ in cross section is placed between two plates each having an area of 1 $cm^2$ and is compressed under a constant load of 5 kg for 3 minutes at 21° C. At the end of this time, the height of the compressed specimen is measured.

The Plasticity Number is equal to 100 times the compressed height (ASTM D-926). Based upon this, a completely incompressible solid (or one that immediately springs back to its original shape) would have a "Plasticity" Number of 1000.

All prior art compositions tested by us have a plasticity substantially below 80 mm in the uncured state, and almost all are sufficiently flowable that they do not have a measurable plasticity.

The present invention is based on a one part RTV silicone composition. Compositions of this general type are well known in the art, for example in EP0816436. One part RTV silicone compositions rely on the penetration of atmospheric moisture to initiate cure, and complete cure can only be achieved in relatively thin product profiles, typically no more than 10-20 mm thick. These materials have generally been used as sealants and adhesives, in industrial assembly applications and for the production of gaskets. These applications usually utilise compositions that are flowable at room temperature so that they can be easily extruded into the area of application (for example, glazing and construction sealants). For some adhesive applications the compositions may alternatively comprise a non-flowable paste like material: a number of electronics applications utilise compositions of this type. Such compositions are not conveniently used for hand moulded items due to their comparatively low viscosity and/or plasticity. However, we have discovered that by preparing one part silicone RTV compositions with a high initial plasticity, formulations can be prepared that are easy and convenient for consumers to mould into a variety of shapes, which once moulded will hold their shape exactly during cure without slump or flow. As the material comprises a one-part composition, no mixing of components by the end user is necessary, thus making it quick and simple to use. The cured elastomer is a non tacky elastomeric material with excellent tactility.

In one embodiment, the materials of the present invention may be moulded into products at point of manufacture, which can then be formed into the final shape by the end-user or consumer. This could be for a large variety of reasons, for example an insert of a material of this kind may be designed into the handle of a product; allowing the end user to shape the handle to the most comfortable shape for them. The high initial plasticity of these formulations allows manufacturers to easily mould silicone parts into products at room temperature, which are then sealed, and end-users can optionally form them to any shape on purchase. In this instance, the high plasticity of the formulations ensures that the parts hold their shape in their uncured form during the manufacturing, assembly, packaging and storage processes, until they reach the end user who forms them to their final shape.

In another embodiment, a material of the present invention may be supplied directly to the consumer, and they may use it to adapt, customize, fix or create things. For example a composition of the present invention may be used by a consumer to cover the handlebars of a bicycle, allowing them to form the shape of this covering layer for their comfort and support. Another composition may be used by a consumer to form into any shape, and be used as a pencil eraser.

In a further embodiment of the present invention, the composition of the present invention is allowed to cure partially in the atmosphere to form a skin on the surface thereof and is then packed in an air-tight and air-free package to inhibit further cure.

It is an advantage of the invention that a wide range of consumers will be able very easily to customize and improve their products and equipment without the need for any tools or equipment, power supply, high temperatures or solvents. In fact only the composition of the present invention and the user's fingers are needed.

It is another advantage of certain embodiments of the invention, that the consumer is able to remove (by simply cutting and prising off) and/or replace customisations they have made without damaging the original surface. On the other hand, it is a great advantage of the invention that, when combined with suitable adhesion promoting primers, an excellent adhesive bond can be formed between these materials and most substrates, especially metals. This is a particularly big advantage in the embodiments where the compositions are moulded into products by manufacturers.

The composition is comfortable to handle at a wide range of temperatures. It can be formed and cured at room temperature, and can be used to customize products or equipment for very hot and very cold environments without any change in state.

A further advantage of the invention is that the composition is normally temperature resistant. It can be applied easily by users to surfaces that become very hot for protection and safety, for example on equipment and machinery, e.g. cooking equipment. In very cold conditions, the temperature resistant nature of the composition of the present invention becomes an advantage, giving users the opportunity to improve workability of equipment in these conditions, e.g. by applying to metal tools they can be used more comfortably without gloves.

Any room temperature vulcanisable silicone elastomer may be used in the present invention, provided that it can be formulated with suitable other components, generally fillers, to achieve the required Williams plasticity within the range from 80 mm to 900 mm. More preferably the plasticity is in the range from 90 to 900 mm, still more preferably from 400 to 900 mm and most preferably from 440 to 900 mm.

The composition of the present invention preferably comprises: a RTV silicone elastomer: a tri or tetra functional hydrolysable silane crosslinker where the functional groups are preferably selected from alkoxy groups, alkenoxy groups, ketoxime groups and acyloxy groups; and one or more fillers. The composition may optionally contain one or more other components such as a curing catalyst, trimethylsilyl terminated polyorganosiloxane, adhesion promoters, functional additives such as pigments, including environmentally sensitive pigments such as thermochromic or pH-sensitive dyes, or thermally or electrically conducting fillers, fragrances etc. The formulations are designed such that the uncured composition has a Williams plasticity from 80 mm to 900 mm.

The silicone elastomer is preferably a hydroxy terminated polyorganosiloxane. The polyorganosiloxane is preferably a material of general formula HO—$(R^1R^2SiO)_n$—H, where $R^1$ and $R^2$, which may be the same as or different from each other, each represents a monovalent substituted or unsubstituted hydrocarbon group; and n is a number such that the viscosity of the polymer lies in the range 25 mPa·s to 2,000,000 mPa·s at 25° C. The value of n in any particular material is not generally determined, and such materials are commonly sold on the basis of their viscosity. In general, n will commonly be at least on the order of thousands or tens of thousands. Examples of hydrocarbon groups which may be represented by $R^1$ or $R^2$ include: alkyl groups having from 1 to 8 carbon atoms, such as the methyl, ethyl, propyl, butyl, isobutyl, sec-butyl, t-butyl, pentyl, isopentyl, t-pentyl, hexyl, isohexyl, t-hexyl, heptyl and octyl groups; mononuclear aryl radicals, such as the phenyl and methylphenyl groups; cycloalkyl groups, such as the cyclohexyl group; and halogenated monovalent hydrocarbon, groups, such as 3,3,3-trifluoropropyl group.

The viscosity of the silicone fluid itself preferably lies in the range 25 mPa·s to 2,000,000 mPa·s at 25° C. More preferably the viscosity is at least 350,000 mPa s. All viscosities reported herein are measured at 25° C.

The hydrolysable crosslinker is preferably a hydrolysable silane of general formula $R_mSiX_{(4-m)}$, wherein R represents a monovalent hydrocarbon group having from 1 to 12 carbon atoms; X represents a ketoxime group, an alkoxy group, an alkenoxy group or an acyloxy group; and m represents 0, 1 or 2, or a partial hydrolysis-condensation product thereof. Examples include: hydrolysable silanes having a ketoxime group, e.g. dimethyldi(butanoxime)silane, methyltri(butanoxime)silane, vinyltri(butanoxime)silane, phenyltri(butanoxime)silane, propyltri(butanoxime)silane, tetra(butanoxime)silane, 3,3,3-trifluoropropyltri(butanoxime)silane, 3-chloropropyltri-(butanoxime)silane, methyltri(propanoxime)silane, methyltri(pentanoxime)silane, methyltri(isopentanoxime)silane, vinyltri(cyclopentarioxime)silane and methyltri(cyclohexanoxime)silane; hydrolysable silanes having an alkoxy group, e.g. dimethyldimethoxysilane, methyltrimethoxysilane. vinyltrimethoxysilane, phenyltrimethoxysilane, methyltriethoxysilane, tetramethoxysilane and tetraethoxysilane; hydrolysable silanes having an alkenoxy group, e.g. vinyltripropenoxysilane and phenyltripropenoxysilane; and hydrolysable silanes having an acyloxy group, e.g. methyltriacetoxysilane, ethyltriacetoxysilane, phenyltriacetoxysilane, vinyltriacetoxysllane and tetraacetoxysilane.

The curing catalyst may be selected from a wide range of options including organometallic compounds, aminoalkyl-substituted alkoxysilanes, amine compounds, salts of the amine compound, quaternary ammonium salts, alkali metal lower fatty acid salts, dialkylhydroxylamines, silanes containing a guanidyl group, or siloxanes containing a guanidyl group, as is well known in the art. Particularly preferred catalysts are tin compounds, for example dibutyltin dilaurate.

Adhesion promoters may be compounds containing at least one alkoxysilyl, amino, epoxy, hydrosilyl, acrylic or a hydroxysilyl group, or a mixture of these. Preferred promoters include trimethoxysilanes such as 3-methacryloxypropyltri-methoxysilane, 3-glycidoxypropyltrimethoxysilane, aminopropyltrimethoxysilane, and alkyl or aryltrimethoxysilanes.

The filler may comprise a non reinforcing filler such as talc, calcium carbonate, wood powder, wheat flour, or a reinforcing filler such as precipitated or fumed silica, or carbon black. More specifically, examples of such fillers include: calcium carbonate (such as dry ground grades of calcium carbonate, wet ground grades of calcium carbonate, beneficiated grades of calcium carbonate, precipitated grades of calcium carbonate, surface treated grades of calcium carbonate); kaolin and other clay-based minerals (such as water fractionated clays, air floated clays, delaminated clays, calcined clays, surface treated clays); talc (such as dry ground talc, beneficiated ground talc, calcined talc, surface-treated talc); quartz and silica, including natural silicas (such as crystalline silica, fused silica, microcrystalline silica, microcrystalline novaculite, diatomaceous silica, perlite) or synthetic silicas (such as fumed silica, precipitated silicas); mica (including ground grades of mica, white grades of mica, surface-modified grades of mica, metal-coated mica grades); metal oxides and other compounds (such as titanium dioxide, alumina trihydrate, wollastonite, barium sulphate, antimony oxide, magnesium hydroxide, calcium sulphate, anhydrous calcium sulphate, dihydrate calcium sulphate, feldspar and nepheline syenite); microspheres, solid microspheres, hollow microspheres (such as coated hollow microsphere fillers, metalite aluminium microspheres, metalite silver microspheres, magnetisable microspheres, hybrid composite microsphere fillers, mini-microspheres, polymer-encapsulated gas microspheres); synthetic silicates (such as aluminium silicate, mullite, sillimanite, cyanite, andalusite, synthetic alkali metal aluminosilicates, calcium silicate, magnesium silicate, zirconium silicate); carbon black (such as furnace black fillers, thermal black fillers); organic fillers (such as bagasse fillers, coconut hull/fibre fillers, cork fillers, corn cob fillers, cotton-based fillers, gilsonite fillers, nutshell flour fillers, rice hull fillers, sisal/hemp fillers, soybean fillers, starch fillers, wood flour); glass, metals and any solid polymer.

The filler may also include functional additives such as pigments, including environmentally sensitive pigments such as thermochromic or pH-sensitive dyes, thermally insulating fillers, or thermally or electrically conducting fillers. Any filler used must be dry to avoid premature curing of the composition.

One part silicone RTV elastomers similar to those used in the present invention are known. However, those previously described in the art do not have a sufficiently high plasticity to be used in the present invention as they have been formulated to obtain more flowable materials than are needed by the present invention. The high plasticity materials described in the present invention are achieved by combining higher viscosity hydroxy terminated polyorganosiloxane fluids than are normally utilised in these compositions together with appropriate quantities of reinforcing and/or extending fillers. The precise viscosity of the hydroxy terminated polyorganosiloxane fluid and the amount of filler used in the present invention will vary depending on the nature of the filler and the degree of stiffness or plasticity required. However, in general, the viscosity of the fluid will be greater than 350,000 mPa s, and the amount of filler will be in the range from 20 to 75% by weight of the entire composition, more preferably from 30 to 66% by weight.

Since the silicone elastomer will cure in the presence of moisture, the fillers, unlike those of our co-pending applications PCT/GB2006/001926 and PCT/GB2006/001931, should be essentially moisture-free. Preferably, the fillers will contain no more than 1% moisture by weight, and more preferably will contain much less than this, suitably as close to zero moisture as possible.

Depending on the desired application, the one part silicone RTV composition may be formulated to be either non adhesive or self adhesive. Optionally, adhesion of non adhesive formulations to a wide range of substrates can be achieved using suitable primers.

In the preferred formulations for a non adhesive composition, the material comprises 20-60% by weight of a hydroxy-terminated poly(dimethylsiloxane) of viscosity greater than 350,000 mPa s; 3-66% by weight of a reinforcing filler such as fumed silica, which may have been treated with a silane, such as hexamethyldisilazane or dimethyldichlorosilane, 10-60% by weight of a non reinforcing filler such as magnesium silicate, 2-6% by weight crosslinker and a suitable quantity of a curing catalyst. Preferred formulations for self adhesive materials are similar, except that 1-5% by weight of a suitable adhesion promoter is additionally included.

The amount of curing catalyst should be sufficient to achieve cure within a reasonable time, say a few days. This amount will vary depending on many factors well known to those skilled in the art, including the nature of the catalyst, ambient conditions, thickness of the material to be cured and the like. In the case of tin and similar catalysts, a minimum amount to achieve reasonably speedy cure is 0.05%, more preferably 0.1%, by weight of the composition. Where it is not required to form a preliminary skin on the product before it is packaged, something like this minimum will be enough, for example from 0.05 to 0.2%, more preferably from 0.1 to 0.2%, by weight of the composition. In the embodiment where a preliminary skin is formed on the product before packaging, it is preferred to use a greater amount of catalyst, preferably at least 0.2% by weight of the composition and more preferably from 0.2 to 2.0% by weight. However, it should be noted that, within reason, greater amounts of catalyst have no adverse effect, and so amounts greater than the recommended maxima may be used, if desired.

The one part room temperature vulcanising silicone elastomer, may be packaged and delivered to the consumer in a number of straightforward and user-friendly ways, provided that the packaging is designed to be air and moisture tight to prevent premature cure.

Thus, it can be seen that there are many advantages and commercial opportunities in providing consumers with customizable parts on products, which can be formed by an individual for his comfort, safety, fun or excitement, and that attempts to do this thus far have been prohibitive to large numbers of users. By following the preferred conditions outlined above, it is possible to provide a method of customizing products that is Easier than any existing method for non-experts
One-part—Requires no mixing by the end user—simply apply pressure as needed and allow to cure
Requires no temperature change to form the shape Requires no special tools to form the shape Requires no temperature change to cure Formable and Cures at room temperature Can easily be incorporated into products in an industrial moulding process Is of sufficiently high plasticity that the uncured material does not slump or sag Is of sufficiently high plasticity that the uncured material is not deformed in the assembly, packaging and storage phases, prior to forming by the end-user Is of sufficiently high plasticity that the uncured material can be formed easily and pleasurably by hand, and a smooth surface can be maintained or achieved with handling and smoothing Uncured formulations may be optionally self-adhesive, so that a bond can be achieved by applying them directly to substrates Uncured formulations may alternatively be applied to a primed substrate to achieve a strong adhesive bond—this will provide a stronger bond which will be an advantage to products manufactured industrially with material parts of the present invention Cures to a resilient and tough finished product, which can be waterproof and comfortable at extreme temperatures—to 250° C.

The uncured compositions of the present invention are packaged in a moisture-tight packaging prior to being allowed to cure by the end-user.

Where the composition of the present invention is moulded industrially as a part in another product, this packaging might be described more as a seal. It may be a sealing material which is applied industrially as a liquid, either dipped, sprayed or brushed on. It may also be a lightweight sheet material such as a metallised plastic or foil, which is sealed as a moisture barrier around the composition of the invention. As a further alternative, the product as a whole may be packaged in a moisture-proof packaging material, e.g. in a moisture-tight box.

Where the composition of the present invention is supplied directly to users independently of other products, the packaging is also moisture tight, and may be a metal tub or other containers, or metallised plastic or foil, or the composition may be dipped, sprayed or brushed with a moisture barrier as above. As a further and preferred alternative, the composition may be encased in a flexible moisture-proof casing which conforms to the shape of the contained composition, in the manner of a sausage skin.

The composition of the invention may be supplied to the end-consumer in single use packs, extruded as a tape, a pad, or a nugget.

The composition may be packaged in any way that prevents the ingress of atmospheric moisture. This includes packaging in pre-formed plastic or metal containers provided that the means of closure is airtight and that the material of which the container is made provides a suitable moisture bather even in warm and moist ambient conditions (preferably up to 100% relative humidity and 40° C.).

Alternatively the composition of the present invention may be packaged loosely in a bag or pouch or bubble pack provided that the method of sealing (typically heat-sealing or adhesive sealing) and the material of construction of the bag or pouch provides a suitable moisture bather even in warm and moist ambient conditions. Suitable such materials may be metallised polyester films or laminated film constructions or films treated with a specific moisture barrier coating (e.g. certain silanes) or materials combining more than one of these options. Such materials are widely commercially available for use in the preservation of food and other moisture-sensitive materials. Optionally, in all of the cases of loose packaging, a moisture absorbing agent, such as activated silica gel or a molecular sieve, may be incorporated within the package, typically in the form of a perforated fabric/plastic/paper sachet containing the drying agent.

In addition to loose packaging, where the packaging materials are amenable, vacuum packaging or shrink-wrapping may be utilised. For all of the packaging options which include vacuum-packing or shrink-wrapping the composition of the present invention may be preformed into a desired shape before packaging takes place.

The composition of the present invention may also be packaged in a manner such that is pre-applied to a substrate in its uncured form (e.g. to the handle of an implement) provided that the coated implement is of a suitable form and size to be shrink-wrapped or vacuum packaged in its entirety with a suitable moisture barrier packaging film. Alternatively, in all of the cases where vacuum packaging or shrink-wrapping can be used, the material may be coated with a liquid substance which cures/dries/cools to form a suitable moisture-vapour impermeable coating. Such substances can be molten polymers or waxes; polymers or waxes applied from solvent solution or dispersion, or mixtures of polymerisable ingredients which react after application to form a continuous moisture-vapour impermeable coating. Such a coating may be rigid or flexible. Flexible coatings have the benefit of allowing the uncured material to be further formed before the packaging is removed. Rigid coatings have the benefit of helping to prevent deformation during assembly, packaging, storage and sale.

In an embodiment in which the compositions of the present invention are moulded into products at the point of manufacture, after moulding, the materials may be exposed to moisture for a limited time to allow the surface only to cure, thus forming a skin. The cure can then be halted by sealing or packaging the moulded part with a material with a sufficient moisture barrier.

The advantage of curing the surface at the stage of manufacture may be to allow an adhesive bond to form between the moulded part and the substrate in certain areas, or to reduce the potential to deform the part by mistake either during assembly, packing, sale, or after purchase by the user while forming the shape. While the surface is cured, beneath this cured surface, the composition is still formable, and, if only a relatively shallow area at the surface is allowed to cure initially, the moulded part will remain essentially mouldable by the end-user.

A further advantage to curing the surface of the part moulded at the point of manufacture is that it allows textures, patterns, embossing or printing to be moulded on the part permanently, while still allowing the general shape of the part to be formed at a later stage, perhaps by the end-user.

The invention is further illustrated by the following non-limiting Examples.

EXAMPLES

The general procedure for Examples 1-7 below is as follows:

The hydroxy-terminated poly(dimethylsiloxane) and the fillers were mixed under ambient conditions of temperature and humidity. This premix was then transferred into a dry environment (<20% humidity) and the crosslinker mixed in, followed by the catalyst and any other components. Once mixing was complete, the mixed composition was returned to ambient conditions of temperature and humidity where the cure behaviour was observed. Cure was considered complete when the shaped polymer could no longer be reshaped and had reached a consistent hardness.

Samples prepared to evaluate Williams plasticity were prepared omitting the crosslinker and catalyst to prevent cure during measurement. The omission of these components in not considered to have a significant impact on the plasticity measured.

Example 1

Non-Adhesive Composition

The following components were used:

| | |
|---|---|
| 10.0 g | Hydroxy terminated poly(dimethylsiloxane) fluid, 350,000 mPa s viscosity (Silopren C350 from GE Bayer Silicones) |
| 1.5 g | Treated Fumed Silica (Cab-o-sil TS 530 from Cabot) |
| 11.0 g | Talc (200 Mesh Magsil from Univar) (Dried) |
| 0.75 g | Methyltris(Methylethylketoxime)Silane), from Fluorochem |
| 0.03 g | Dibutyltin Dilaurate, 95% from Aldrich |
| 0.15 g | Pigment (Holcosil NS Red, Holland Colours) |

After compounding, the elastomer was formed into 2 small spheres of 15 mm diameter, and cure was monitored. The material was found to provide good qualitative physical properties, namely surface and overall material feel, texture, working time and full cure time, resiliency, tear resistance and resistance to abrasion.

The uncured material was found to leave slightly too much residue on hands when forming the sample by hand—this sample is at the lower end of the acceptable range of plasticity of the uncured material.

The properties of the material were as shown in Table 1.

TABLE 1

| | |
|---|---|
| Working time (until surface begins to skin) | 15 minutes |
| Sample was elastic at | 5 hours |
| Cure time (full cure) | <24 hours |
| Uncured Material Qualitative Analysis | Smooth, easy to form and achieve detail, exhibits some slump during cure |
| Cured Material Qualitative Analysis | Resilient, hard and tough |

Cured samples of the same formulation were tested for physical properties. Excellent material strength, adhesion and resistance to abrasion were observed as shown in the following Table 2: Adhesion was tested on an aluminium substrate. The aluminium sheet was primed with a slime adhesion promoter (SS 4004P, GE Bayer Silicones. Peel Strength was tested and results are shown in the following Table 2.

TABLE 2

| Physical Property Test | Result |
|---|---|
| Tensile strength | 1.96 MPa |
| Modulus 100 | 1.95% |
| Elongation at break | 125% |
| Average Peel strength | 1.86 N/mm |
| DIN Abrasion | 298 |

Example 2

Self Adhesive Composition

The following components were used:

| | |
|---|---|
| 10.0 g | Hydroxy terminated poly(dimethylsiloxane) fluid, 350,000 mPa s viscosity (Silopren C350 from GE Bayer Silicones) |
| 1.5 g | Treated Fumed Silica (Cab-o-sil TS 530 from Cabot) |
| 11.0 g | Talc (200 Mesh Magsil from Univar) (Dried) |
| 0.75 g | Methyltris(Methylethylketoxime)Silane), from Fluorochem |
| 0.03 g | Dibutyltin Dilaurate, 95% from Aldrich |
| 0.15 g | Pigment (Holcosil NS Red, Holland Colours) |
| 0.54 g | SS4004P(Silane, GE Bayer Silicones) |

Samples were formed as in Example 1. Cure behaviour and qualitative analysis were observed and the results reported in Table 3.

TABLE 3

| | |
|---|---|
| Working time (until surface begins to skin) | 12 minutes |
| Sample was elastic at | 5 hours |
| Cure time (full cure) | <24 hours |
| Uncured Material Qualitative Analysis | Smooth, easy to form and achieve detail, exhibits some slump during cure |
| Cured Material Qualitative Analysis | Resilient, hard and tough |

Samples were formed as in Example 1 to test self-adhesion. Samples were applied immediately after mixing was finished to the following un-primed surfaces and adhesion observed at 150 minutes and 17 hours. Good adhesion to glass, stainless steel and aluminium were observed after 150 minutes and excellent adhesion to glass, stainless steel, wood and aluminium were observed after 17 hours.

Examples 3-5

These formulations were prepared omitting catalyst and crosslinker in order to measure the Williams plasticity. The results are shown in the following Table 4:

TABLE 4

| | Weight PDMS-OH (g) | Viscosity PDMS-OH (mPa s) | Weight silica (g) | Weight talc (g) | Williams plasticity at 25° C. (mm) |
|---|---|---|---|---|---|
| Example 3 | 10.0 | 320,000 | 1.0 | 10.0 | 89 |
| Example 4 | 10.0 | 1,000,000 | 5.0 | 10.0 | 287 |
| Example 5 | 10.0 | 1,000,000 | 6.3 | 0.0 | 445 |

Materials used were as for Examples 1 and 2 except that the silicone fluid used in Examples 4 and 5 was Rhodia 48V. The plasticity of Example 3 is considered to be at the low end of what is acceptable for the application.

Example 6

Non Adhesive Composition

The composition in this Example is similar to that of Example 4, with the addition of 0.75 g Methyltris(Methylethylketoxime)Silane and 0.03 g Dibutyltin Dilaurate. Cure behaviour and cured material characteristics were observed and are reported in Table 5.

TABLE 5

| | |
|---|---|
| Working time (until surface begins to skin) | 10 minutes |
| Sample was elastic at | 5 hours |
| Cure time (full cure) | <24 hours |
| Uncured Material Qualitative Analysis | Smooth consistency, easy to form, leaves no residue on hands when forming and shows no slump during cure |
| Cured Material Qualitative Analysis | Resilient, soft and elastic |

Example 7

A formulation where the sample was moulded into shape, the surface cured by exposing to atmospheric moisture, and then cure was halted by packaging the sample in a material with a sufficient moisture barrier.

The following components were used:

| | |
|---|---|
| 10.0 g | Hydroxy terminated poly(dimethylsiloxane) fluid, 350,000 mPa s viscosity (Silopren C350 from GE Bayer Silicones) |
| 1.5 g | Treated Fumed Silica |
| 8.0 g | Magsil Diamond Talc |
| 1.4 g | Methyltris(Methylethylketoxime)Silane), from Fluorochem |
| 0.1 g | Dibutyltin Dilaurate, 95% from Aldrich |
| 0.15 g | Pigment (Holcosil NS, Holland Colours) |

After compounding, the elastomer was moulded into 6 small lozenges of 20 mm diameter, and exposed in an atmosphere of 50% humidity, at 21° C. for 2 hours. At 2 hours, the skin was found to be 1.3 mm thick, and was tough and elastic. Under that skin, the material was found to have remained uncured, and it was found that the sample could be formed into a variety of shapes, limited by the cured shape of the outside skin. 5 of the samples were packaged in a heat-sealed polymer film (with a moisture barrier of <0.1 g/M²/24 Hrs at 25° C. 75% RH). These were opened at weekly and longer intervals, and it was found that the skin did not thicken after the samples were packaged.

When each sample was exposed to atmospheric moisture (average 50% humidity, 21° C.), the samples cured to a depth of 3-5 mm in 24 hours. Cured samples were observed for physical properties, and excellent material strength and resistance to abrasion were observed.

6 Samples of the same formulation were tested for adhesion to aluminium: 6 aluminium sheet pieces were primed with a silane adhesion promoter (SS 4004P, GE Bayer Silicones). Samples were formed on the surface of the aluminium sheet measuring 1 mm depth at the outer rim, and 3 mm depth at the centre of the sample. Samples were exposed to atmospheric moisture (50% humidity, 21° C.), for a period of 2 hours, after which 3 of the samples were packed into a heat-sealed polymer film (with a moisture barrier of <0.1 g/M²/24 Hrs at 25° C. 75% RH). One sample was observed immediately for adhesion, and adhesion was found to be excellent at the rim where the sample was 1 mm in depth, and cured. The remaining 5 samples were observed over time, and the skin was found not to have developed further after packaging. Adhesion of fully cured samples to the aluminium pieces was found to be excellent.

The invention claimed is:

1. A one part room temperature curable silicone elastomer composition where the uncured composition is hand-moldable and has a Williams plasticity from 80 mm to 900 mm, consisting of hydroxy-terminated poly(dimethylsiloxane) having a viscosity greater than 350,000 mPa·s (25° C.), filler, crosslinker, curing catalyst, and optionally, one or more other components selected from the group consisting of adhesion promoters, fragrances and pigments, wherein
   the amount of hydroxy-terminated poly(dimethylsiloxane) having a viscosity greater than 350,000 mPa·s (25° C.) is 20-60% by weight;
   the filler is a combination of 3-66% by weight of reinforcing filler and 10-60% by weight of extending filler;
   the reinforcing filler is selected from the group consisting of precipitated silica, fumed silica and carbon black;
   the amount of crosslinker is 2-6% by weight; and
   the extending filler is selected from the group consisting of calcium carbonate, clay mineral, talc, quartz, mica, titanium dioxide, alumina trihydrate, wollastonite, barium sulphate, antimony oxide, magnesium hydroxide, calcium sulphate, feldspar, nepheline syenite, microspheres, synthetic silicates, bagasse, coconut hull/fibre, cork, corn cob, cotton-based fillers, gilsonite, nutshell flour, rice hull, sisal/hemp, soybean, starch, wood powder, wheat flour, and glass.

2. A composition according to claim 1 in which the composition has a Williams plasticity from 90 to 900 mm.

3. A composition according to claim 2, in which the composition has a Williams plasticity from 400 to 900 mm.

4. A composition according to claim 3, in which the composition has a Williams plasticity from 440 to 900 mm.

5. A composition according to claim 1, wherein the composition has a skin on its surface.

6. A composition according to claim 1, wherein the composition further comprises an adhesion promoter.

7. A composition according to claim 6, containing 1-5% by weight of the adhesion promoter.

8. A composition according to claim 1, wherein the reinforcing filler comprises fumed silica.

9. A composition according to claim 1, wherein the extending filler comprises magnesium silicate.

10. A composition according to claim 1, wherein the clay mineral is selected from the group consisting of kaolin, water fractionated clay, air floated clay, delaminated clay, calcined clay, and surface treated clay, the silica filler is a natural silica selected from the group consisting of crystalline silica, fused silica, microcrystalline silica, microcrystalline novaculite, diatomaceous silica, and perlite, and synthetic silica selected from the group consisting of fumed silica, and precipitated silica, and the synthetic silicates are selected from the group consisting of aluminum silicate, mullite, sillimanite, cyanite, and alusite, synthetic alkali metal aluminosilicates, calcium silicate, magnesium silicate, and zirconium silicate.

11. A composition according to claim 1, wherein the extending filler is selected from the group consisting of calcium carbonate, talc, wood powder and wheat flour.

12. A composition according to claim 1, wherein the composition is an adhesive composition.

* * * * *